United States Patent
Nousias et al.

(10) Patent No.: US 9,465,758 B2
(45) Date of Patent: Oct. 11, 2016

(54) RECONFIGURABLE INSTRUCTION CELL ARRAY WITH CONDITIONAL CHANNEL ROUTING AND IN-PLACE FUNCTIONALITY

(71) Applicant: QUALCOMM Incorporated, San Diego, CA (US)

(72) Inventors: Ioannis Nousias, San Diego, CA (US); Sami Khawam, San Diego, CA (US); Mark Ian Roy Muir, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 703 days.

(21) Appl. No.: 13/905,032

(22) Filed: May 29, 2013

(65) Prior Publication Data

US 2014/0359174 A1    Dec. 4, 2014

(51) Int. Cl.
*G06F 13/20* (2006.01)
*G06F 15/78* (2006.01)

(52) U.S. Cl.
CPC ........... *G06F 13/20* (2013.01); *G06F 15/7867* (2013.01)

(58) Field of Classification Search
CPC ............... G06F 13/20; G06F 15/7867; G06F 15/17343
See application file for complete search history.

(56) References Cited

U.S. PATENT DOCUMENTS

| | | |
|---|---|---|
| 5,956,518 A | 9/1999 | DeHon et al. |
| 7,193,994 B1 | 3/2007 | Payson |
| 8,155,113 B1 | 4/2012 | Agarwal |
| 2005/0289326 A1 | 12/2005 | Lea |
| 2009/0193384 A1 | 7/2009 | Sima et al. |
| 2010/0122105 A1 | 5/2010 | Arslan et al. |
| 2012/0089812 A1 | 4/2012 | Smith |
| 2014/0094157 A1* | 4/2014 | Nguyen .............. H04W 88/085 455/418 |

OTHER PUBLICATIONS

International Search Report and Written Opinion—PCT/US2014/039612—ISA/EPO—Dec. 23, 2014.

* cited by examiner

*Primary Examiner* — Dang Ton
*Assistant Examiner* — Mandish Randhawa
(74) *Attorney, Agent, or Firm* — Haynes and Boone, LLP

(57) ABSTRACT

A reconfigurable instruction cell array is disclosed that includes an array of switch boxes. Each switch box within the array includes a set of I/O ports that are configured to receive a plurality of input channels from neighboring switch boxes in the array. Within a switch box, one of the I/O ports conditionally selects from the input channels received by the remaining I/O ports in the switch box to form a plurality of output channels to be driven to a neighboring switch box in the array.

17 Claims, 7 Drawing Sheets

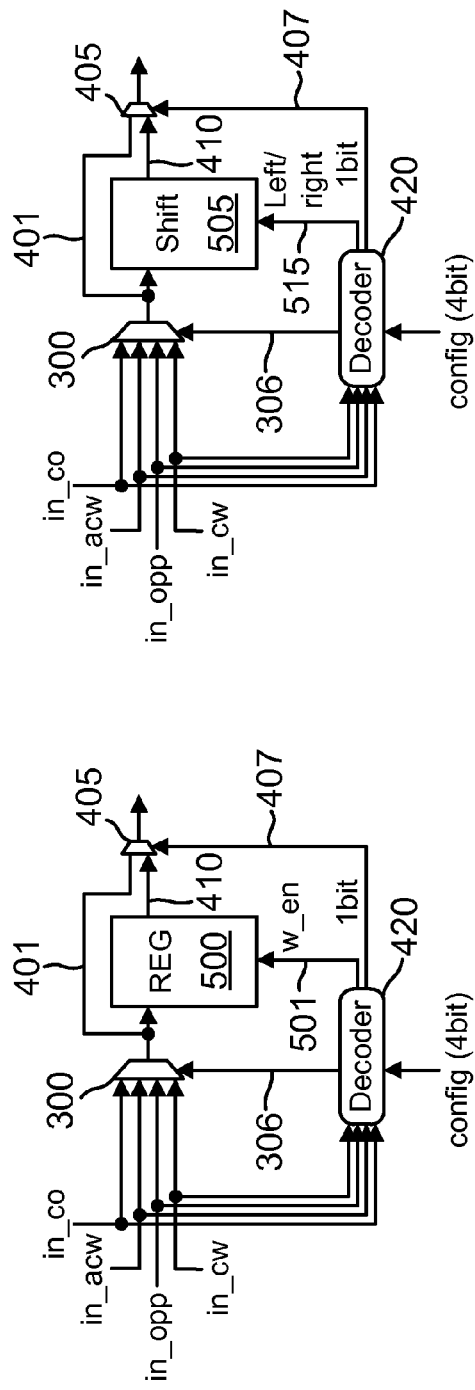
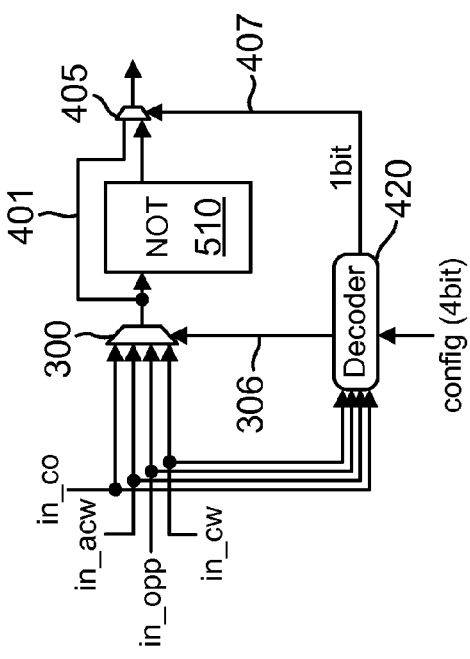
FIG. 5A
FIG. 5B
FIG. 5C

RECONFIGURABLE INSTRUCTION CELL ARRAY WITH CONDITIONAL CHANNEL ROUTING AND IN-PLACE FUNCTIONALITY

TECHNICAL FIELD

This application relates to reconfigurable instruction cell arrays (RICAs), and more particularly to a RICA with in-place functionality.

BACKGROUND

Although microprocessor computing power has been progressively increased, the need for additional increases remains unabated. For example, smart phones now burden their processors with a bewildering variety of tasks. But a single core processor can only accommodate so many instructions at a given time. Thus, it is now common to provide multi-core or multi-threaded processors that can process sets of instructions in parallel. But such instruction-based architectures must always battle the limits imposed by die space, power consumption, and complexity with regard to decreasing the instruction processing time.

As compared to the use of a programmable processing core, there are many algorithms that can be more efficiently processed in dedicated hardware. For example, image processing involves substantial parallelism and processing of pixels in groups through a pipeline of processing steps. If the algorithm is then mapped to hardware, the implementation takes advantages of this symmetry and parallelism. But designing dedicated hardware is expensive and also cumbersome in that if the algorithm is modified, the dedicated hardware must be redesigned.

To provide an efficient compromise between instruction-based architectures and dedicated hardware approaches, a reconfigurable instruction cell array (RICA) architecture has been developed. FIG. 1A illustrates an example RICA system 50. In this RICA system 50, a plurality of instruction cells 2 are interconnected through a programmable switching fabric 4. The configuration of the instruction cells (with regard to what sort of logical function or instruction they implement) as well as the switching fabric can be reprogrammed every clock cycle as necessary to implement a given algorithm or function. The instruction cells process data as retrieved by MEM cells 12 (which in turn are loaded from a data RAM 8). This processing by the instruction cells 2 occurs according to configuration instructions 10 obtained from a configuration RAM 6. A decode module 11 decodes instructions 10 to not only get the programming for the instructions cells 2 but also for the switching fabric 4. Additional features shown in FIG. 1A are described in U.S. Patent Publication No. 2010/0122105, filed Apr. 28, 2006, the contents of which are hereby incorporated by reference in their entirety.

Note the advantages of RICA: an algorithm such as image processing that involves processing multiple pixels through a pipelined processing scheme can be mapped to instruction cells in a manner that emulates a dedicated hardware approach. But there is no need to design dedicated hardware, instead one can merely program the cells and switching fabric as necessary. Thus, if an algorithm must be redesigned, there is no need for hardware redesign but instead a user may merely change the programming as necessary. This is quite advantageous over traditional instruction-based computing approaches.

Although RICA thus offers robust advantages, challenges remain in its implementations. For example, it is conventional to arrange the instruction cells in a reconfigurable array by rows and columns. Each instruction cell, any associated register, and the input and output switching fabric may be considered to reside within a switch box. FIG. 1B shows an example array of switch boxes arranged in rows and columns. The switching fabric in each switch box must then accommodate a data path that might begin at a given switch box 100 at some row and column location and then end at some other switch box 105 at a different row and column location. In this data path, two instruction cells are configured arithmetic logic units (ALUs) 110. The instruction cells for the remaining switch boxes are not shown for illustration clarity. Note that each switch box must then accommodate two switching matrices or fabrics: an input switching fabric to select for the inputs to its instruction cell and also an output switching fabric to select for the outputs from the switch box.

In contrast to an instruction cell, the logic block in a field programmable gate array (FPGA) uses lookup tables (LUTs). For example, suppose one needs an AND gate in the logic operations carried out in a configured FPGA. A LUT would then be programmed with the truth table for the AND gate logical function. But an instruction cell is much "coarser-grained" in that it contains dedicated logic gates. For example, an ALU instruction cell would include assorted dedicated logic gates. It is the function of the ALU instruction cell that is configurable—its primitive logic gates are dedicated gates and thus are non-configurable. For example, a conventional CMOS inverter is one type of dedicated logic gate. There is nothing configurable about such an inverter, it needs no configuration bits. But the instantiation of an inverter function in a FPGA programmable logic block is instead performed by a corresponding programming of a LUT's truth table. Thus, as used herein, the term "instruction cell" refers to a configurable logic element that comprises dedicated logic gates.

An instruction cell performs its logical functions on one or more operands to form an instruction cell output. An operand in this context is a received input channel. Depending upon its configuration bits, an instruction cell is configured to perform corresponding logical operations. For example, a first switch box may include an ALU instruction cell configured to add two operands corresponding to two channel inputs. But the same ALU instruction cell may later be updated to subtract the two operands. The instruction cell output that results from the logical operation within the instruction cell may be required in another instruction cell. Thus, the output switch fabric in the first switch box would be configured to drive the instruction cell output out of the first switch box through corresponding channel outputs. In contrast, an FPGA's LUTs each produce a bit, they do not generate words. So the switch fabric in an FPGA is fundamentally different from the switch fabrics in a RICA in that an FPGA's switch fabric is configured to route the bits from the FPGA's LUTs. In contrast, the routing between switch boxes in a RICA is configured to route words as both input channels and output channels. For example, a switch box array maybe configured to route twenty channels. Switch boxes in such an embodiment may thus receive twenty input channels from all four directions (as defined by the row and column dimensions) and drive twenty output channels in the four directions. The column dimension may be considered to correspond to the north and south directions for any given switch box. Similarly, the row dimension may be considered to correspond to the east and west directions.

Each output channel from a switch box may be selected for by a corresponding channel output multiplexer within the switch box. Such a channel output multiplexer comprises a collection of output multiplexers, each output multiplexer corresponding to just one bit of the channel word width. The following discussion is referring to the channel output multiplexer that selects for the entire channel but it will be understood that such a channel output multiplexer actually comprises a plurality of output multiplexers each having a single bit output. With regard to any given output direction (e.g., north, south, east, or west), there are three remaining input directions. For example, a north output channel may be selected from the east, west, and south input channels. Each channel output multiplexer for a given output direction could thus comprise a 3:1 multiplexer. But an output channel may also be driven by a switch box's instruction cell output. Thus, each channel output multiplexer may comprise a 4:1 multiplexer in a RICA switch box. If the column channels are assumed to travel in north and south directions, a switch box would thus require twenty 4:1 channel output multiplexers to drive the north output channels and another twenty 4:1 channel output multiplexers to drive the south output channels in a twenty channel embodiment. Similarly, row channels may be assumed to travel in the east and west directions. Thus, a switch box in a twenty channel embodiment would include twenty 4:1 channel output multiplexers to drive the east output channels and twenty 4:1 channel output multiplexers to drive the west output channels. The resulting set of 4:1 channel output multiplexers for all four directions forms the output switch fabric for each switch box.

Each 4:1 channel output multiplexer requires two configuration bits to control which one of the 4 inputs it has available that should be selected to drive the 4:1 channel output multiplexer's output channel. In a conventional RICA, these configuration bits are static: they are part of the configuration stream that also configures the logical operation of the instruction cells and the input switch fabric for each switch box. But certain applications such as multimedia applications require conditional moves that a static output switching fabric cannot accommodate.

Accordingly, there is a need in the art for or reconfigurable instruction cell arrays having output switch fabrics with conditional move capabilities.

SUMMARY

In a reconfigurable instruction cell array (RICA), an array of instruction cells are configured by corresponding configuration words to implement a desired logical algorithm or operation. Each instruction cell associates with a set of corresponding I/O ports in a unit designated as a switch box. The array of instruction cells thus comprises a corresponding array of switch boxes. Each I/O port in a switch box receives a plurality of input channels from another I/O port (either a neighboring switch box or the same switch box depending upon the switch box's position in the array). Within a switch box, the instruction cell may be configured to perform a logical operation on at least one of the received input channels from the switch box's I/O ports to form an instruction cell output. Each I/O port in a switch box is configurable to select from the input channels received by the remaining I/O ports in the switch box as well as from the instruction cell output to form a plurality of output channels. In turn, the plurality of output channels from a switch box's I/O port are received as the plurality of input channels by another I/O port (in an adjacent switch box or in the same switch box depending upon the switch box's position in the array).

To make the selection for its output channels, each I/O port includes a conditional routing circuit for each output channel. An I/O port's conditional routing circuit is configured to select from a group of signals that comprises a received input channel from each remaining I/O port in the switch box and the instruction cell output to form the corresponding output channel. To enhance RICA operation and flexibility, the selection by the conditional routing circuit may be conditioned by a decoding of a selected signal from the group of signals. In this fashion, the decoding of the selected signal controls the routing by the conditional routing circuit. In contrast, it was conventional for this routing to be statically determined by the switch box's configuration word.

To further enhance RICA operation and flexibility, the conditional routing circuit may include a functional unit that processes the selection by the conditional routing circuit.

BRIEF DESCRIPTION OF THE DRAWINGS

FIG. 5A illustrates an embodiment of the conditional routing circuit of FIG. 4 in which the in-place functionality is implemented by a register.

FIG. 5B illustrates an embodiment of the conditional routing circuit of FIG. 4 in which the in-place functionality is implemented by a shift circuit.

FIG. 5C illustrates an embodiment of the conditional routing circuit of FIG. 4 in which the in-place functionality is implemented by an inverter.

DETAILED DESCRIPTION

To meet this need in the art for improvements to static routing, a RICA having output switch fabrics with conditional routing is disclosed. In addition, each switch box may have in-place functionality for the output channels. For example, one type of in-place functionality may comprise a register. To better understand the conditional routing and in-place functionality disclosed herein, it is useful to again consider a static (non-conditional) output switch fabric for a reconfigurable instruction cell array (RICA). As discussed above, each switch box in a RICA includes an output switch fabric. This output switch fabric is defined with regard to the row and column directions in that the switch boxes themselves are arranged in rows and columns. In that regard, what is a "row" versus what is a "column" is simply a matter of perspective. Thus, the terms row and column are used herein without loss of generality. In an array of rows and columns, an input channel to a given switch box may be coming from a switch box in the same row. The row directions may be considered to be in the "east" and "west" directions. The channel directions may be considered to be in the "north" and "south" directions. Given this background, the conditional routing and in-place functionality may now be discussed as follows.

Overview

Figure 2:
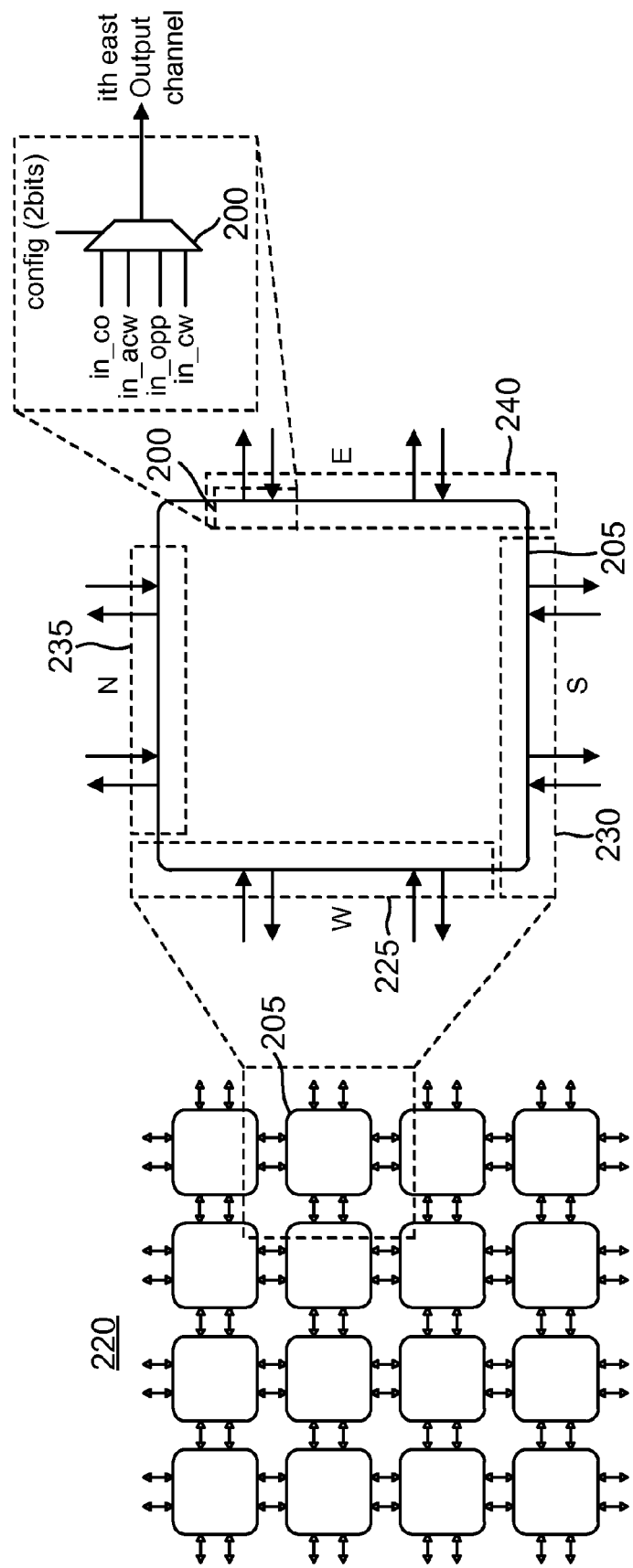
FIG. 2 illustrates the I/O ports for a switch box in an array of switch boxes as well as a channel output multiplexer for one of the I/O ports.

The channel input and output directions are shown for an example switch box 205 in an array 220 in FIG. 2. Given this north, south, east, and west routing corresponding to the row and column arrangement of the switch boxes, each switch box such as switch box 205 may be considered to include an input/output (I/O) port for each direction. For example, switch box 205 has a west I/O port 225, a south I/O port 230, a north I/O port 235, and an east I/O port 240. At each I/O port, switch box 205 receives the plurality of input channels and outputs the plurality of output channels. For example, switch box 205 receives all the south input channels through south I/O port 230. Similarly, switch box 205 drives all the south output channels through south I/O port 230. Each I/O port thus comprises the output switch fabric for driving the I/O port's output channels.

With regard to each I/O port, the output channels are selected for by corresponding channel output multiplexers. Each output channel thus has its own corresponding channel output multiplexer at any given I/O port. For illustration clarity, only a single channel output multiplexer 200 is shown for an east output channel for east I/O port 240 in switch box 205. This channel will be designated as the ith east output channel in that the particular channel "i" it represents is arbitrary. Additional east output channels would be provided by analogous channel output multiplexers. Similarly, the north, south, and west output channels would also be selected for by their own corresponding channel output multiplexers. The resulting set of I/O ports 225, 230, 235, and 240 (each one comprising a plurality of channel output multiplexers) makes up the output switch fabric for switch box 205. With regard to any particular output channel driven out of a given I/O port, the corresponding channel output multiplexer may be configured to select for the same input channel received by the I/O port in the opposite direction. For example, an 'ith" west output channel may be driven by the ith east input channel, where i is some arbitrary channel number. Similarly, an ith north output channel may be driven by an ith south input channel and so on.

Since channel output multiplexer 200 is driving the ith east output channel, it receives an "in_opp" input channel that corresponds to the west input for channel i. The in_opp input may also be referred to as the opposite input. Each channel output multiplexer may also select from input channels received at the I/O ports in the orthogonal directions. In other words, the channel output multiplexer for a west output channel may select from an input channel in the north and south directions. Similarly, the channel output multiplexer for a north output channel may select from the input channels in the east and west directions. In that regard, the orthogonality for such a selection may be denoted as being either clockwise or anti-clockwise with regard to the output direction for a channel output multiplexer. For example, from the perspective of channel output multiplexer 200, it is an anti-clockwise rotation to select from a north input channel. Similarly, it is a clockwise rotation to select from a south input channel for channel output multiplexer 200. Thus each channel output multiplexer in the I/O ports in switch box 200 can select from a clockwise (in_cw) input channel and also from an anti-clockwise (in_acw) input channel. In addition, each channel output multiplexer can also select the instruction cell output word (in_co) to drive its output channel.

Figure 1A:
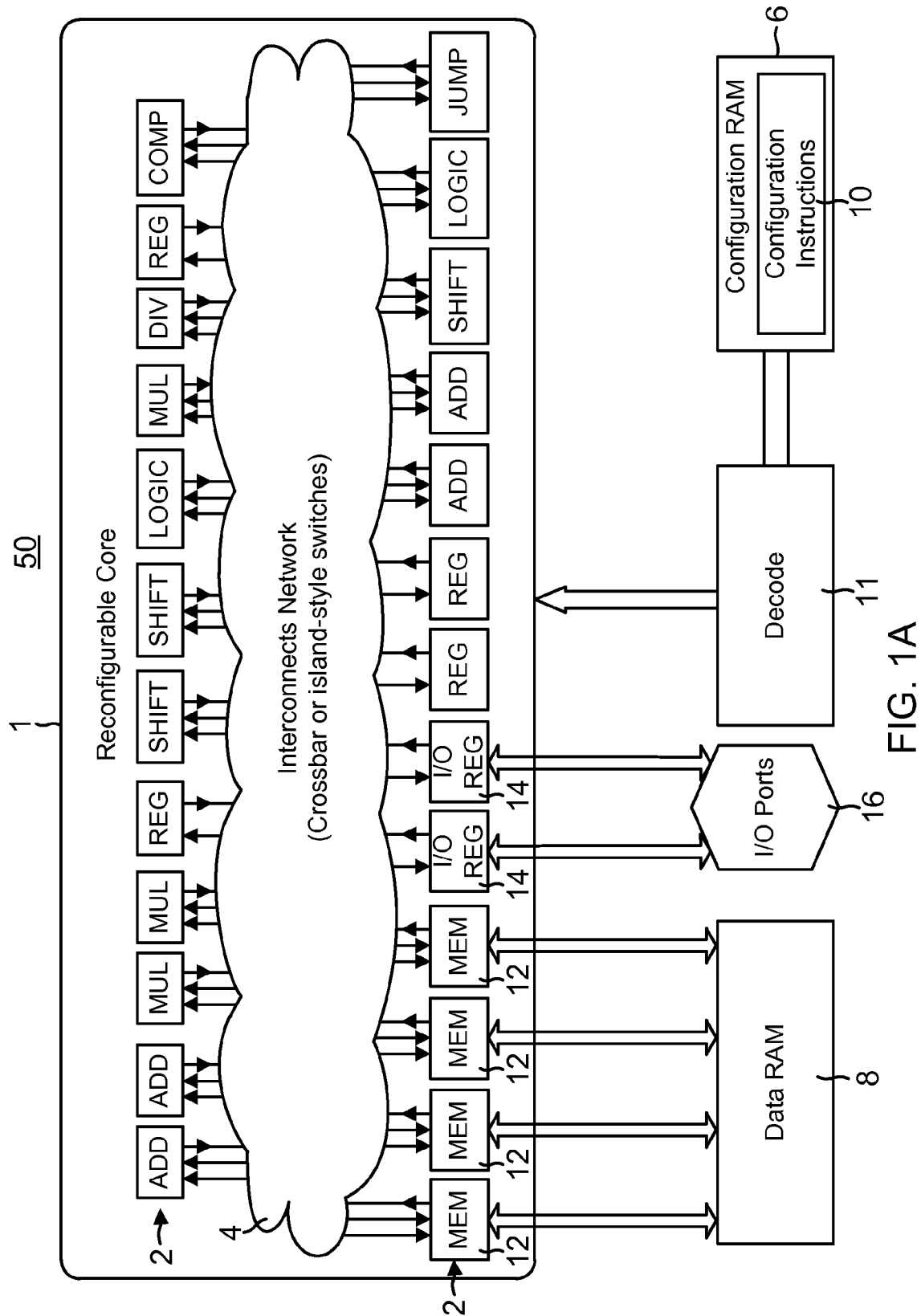
FIG. 1A is a block diagram for an example reconfigurable instruction cell array (RICA).
Figure 1B:
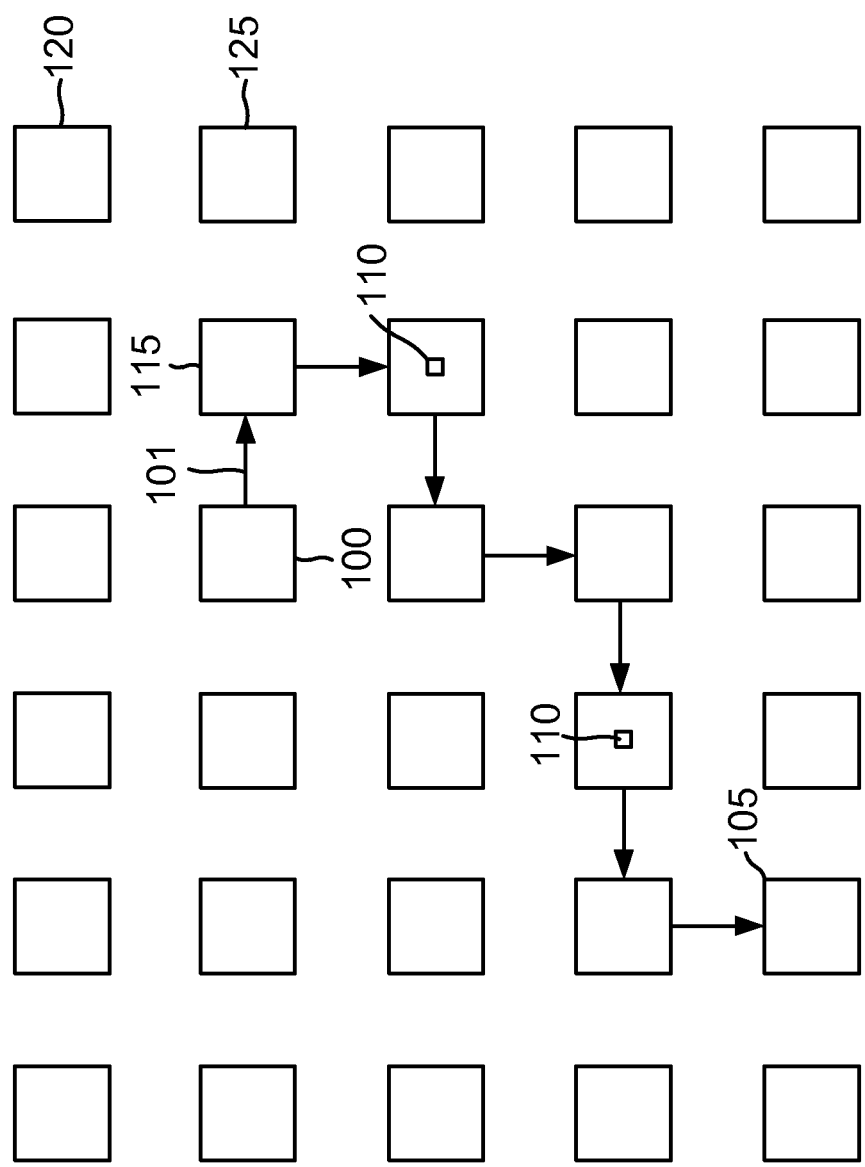
FIG. 1B is a block diagram for an array of switch boxes in the RICA of FIG. 1A.

Referring again to FIG. 1B, it may be seen that switch boxes such as a switch box 120 at the edge of the array will have I/O ports that do not face a neighboring switch box. For example, an east I/O port for switch box 120 has no neighboring switch box to its east. Thus, the output channels from I/O ports that do not face other switch boxes are configured to "wrap around" to an adjacent switch box. For example, the east output channels from switch box 120 are wrapped around to become the east input channels to an adjacent switch box 125.

Figure 3:
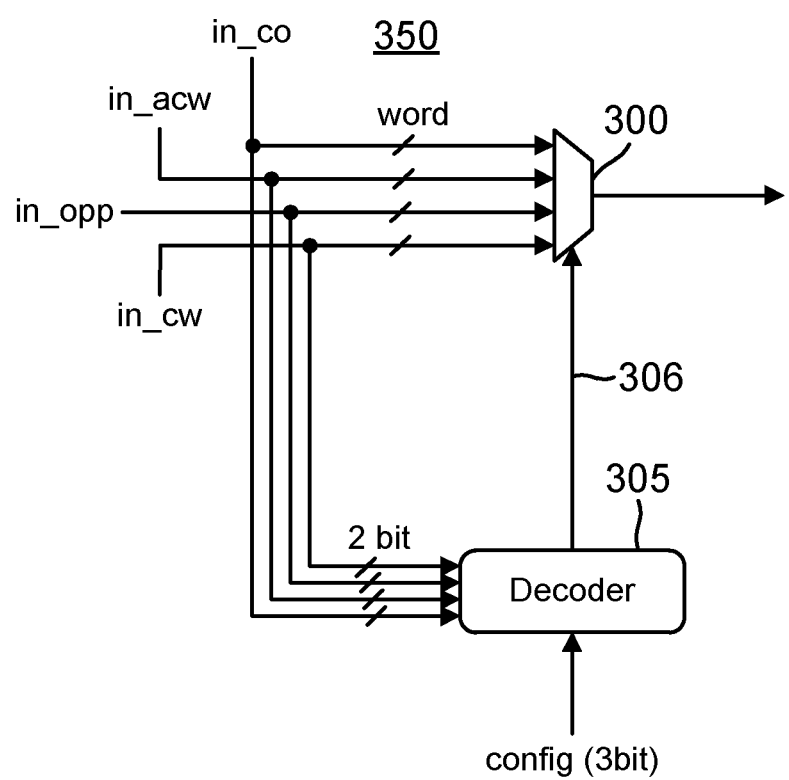
FIG. 3 illustrates a conditional routing circuit for a switch box's I/O port.

To provide conditional routing capability to a channel output multiplexer, a conditional routing circuit 350 is introduced as shown in FIG. 3. Conditional routing circuit 350 includes a channel output multiplexer 300. As discussed with regard to multiplexer 200, channel output multiplexer 300 multiplexes from the opposite, clockwise, anti-clockwise, and cell output words to drive its output channel. A decoder 305 controls whether conditional routing circuit 350 operates in a static routing mode of operation or in a conditional routing mode of operation. In a static routing mode of operation, channel output multiplexer 300 is controlled by decoder 305 to operate as discussed with regard to channel output multiplexer 200 of FIG. 2. In a static mode of operation, decoder 305 may be configured by configuration bits to control which of the four input words (opposite, clockwise, anti-clockwise, and cell output) is selected by channel output multiplexer 300. But in a conditional routing mode of operation, the selection by channel output multiplexer 300 is based upon a decoder-selected one of the four input words.

Given three configuration bits, decoder 305 may be configured into one of eight different states. Four of these states may control the static mode of operation. In other words, a first state for decoder 305 would control channel output multiplexer 300 to statically select for a first one of the four input words, another state would control channel output multiplexer 300 to statically select for a second one of the four input words, and so on. In general, it is often useful to have a default state in which channel output multiplexer 300 is shut down. Thus, decoder 305 may be configured for a disabled state in which 4:1 channel output multiplexer 300 disables its output. Given three configuration bits, decoder 305 may thus decode for another three states. These states may be the states used in the conditional routing mode of operation. For example, in one state the anti-clockwise word (in particular, two of its bits) may be decoded by decoder 305 to control the selection by channel output multiplexer 300 of the remaining three clockwise, opposite, and instruction cell output words. In this state, the anti-clockwise word would be selected by decoder 305 and decoded into a first address signal 306 that controls the selection by multiplexer 300. In another state, the opposite word may be selected and decoded by decoder 305 to control the selection by channel output multiplexer 300 of the remaining three clockwise, anti-clockwise, and instruction cell output words, and so on. Since only three states are available from three configuration bits, one of the four input words would not have the ability to control the selection by channel output multiplexer 300 through its decoding in decoder 305. But in an alternative embodiment, decoder 305 could receive more than three configuration bits such that each input word could control the selection by channel output multiplexer 300.

In the conditional routing mode of operation, decoder 305 selects one of the input words and decodes the decoder-selected word (or a portion thereof) to form first address signal 306 that controls the selection by channel output multiplexer 300. In the conditional routing mode of operation, channel output multiplexer 300 selects from the three remaining input words based upon the decoding of the decoder-selected input word. Such a selection from three input words requires just two bits. Thus, decoder 305 receives two bits from each input word (in_co, in_opp, in_cw, and in_acw). Decoder 305 can map or decode the two bits from the decoder-selected input word into first address signal 306 in the conditional routing mode of operation. But the actual number of bits provided to decoder 305 from each input word is arbitrary in that other embodiments could provide additional bits from each input word to decoder 305. Moreover, even though decoder 305 needs just two bits from the decoder-selected input word, decoder 305 may still be considered to receive a selected input word in its entirety from the group consisting of the opposite, clockwise, anti-clockwise, and instruction cell words. The extra bits in the decoder-selected input word may then be considered to comprise don't care values with regard to a decoding into first address signal 306 to control the selection by channel output multiplexer 300.

In one embodiment, the selection by decoder 305 from the input words is determined solely by the configuration bits received by decoder 305. In an alternative embodiment, the decoder selection may be conditional itself based upon the input words. In other words, decoder 305 may be configured by the configuration bits to decode the received bits from input words in_co, in_acw, in_opp, and in_cw signals to determine their logical state. If these received bits are decoded into a first logical state, decoder 305 may for example, decode the instruction cell output word into first address signal 306 to control the selection by multiplexer 300 from the remaining opposite, clockwise, and anti-clockwise input words. But if the received bits from the input words are decoded into a second logical state, then decoder 305 may decode, for example, the received bits from the clockwise input word into first address signal 306 to control the selection by multiplexer 300, and so on. It will be appreciated that such a conditional selection of the decoder-selected input word involves two layers of decoding: a first layer to decode the logical state of the input words to determine the decoder selection; and a second layer to decode the decoder-selected word to form first address signal 306.

In conditional routing circuit 350, the clockwise, anti-clockwise, instruction cell output, and opposite words received by multiplexer 300 may be considered to form a group of input words. In the conditional routing mode of operation, decoder 305 selects from this group of input words to form a decoder-selected input signal that is decoded into first address signal 306 to control the selection by channel output multiplexer 300 from remaining ones of the group of input words. This selection by decoder 305 from the group of input words may be driven by configuration bits alone or by configuration bits and a logical state of the input signals. Regardless of how the selection is made, decoder 305 decodes the selected word into first address signal 306.

Multiplexer 300 may also be designated as a "first multiplexer" in conditional routing circuit 350. Note also that there are two selections in a conditional routing mode of operation: there is a first selection by decoder 305 as to which of the input words in_co, in_acw, in_opp, and in_cw will control the selection by channel output multiplexer 300, and there is a second selection by channel output multiplexer 300 from the remaining input words as controlled by first address signal 306. It will be appreciated that the number of input signals in the group of input signals selected from by multiplexer 300 need not be four but may be varied in other embodiments. For example, suppose the group of input signals selected from by multiplexer 300 numbered eight. In such an embodiment, multiplexer 300 would require three address bits as opposed to the two bits that make up first address signal 306 in FIG. 3.

Figure 4:
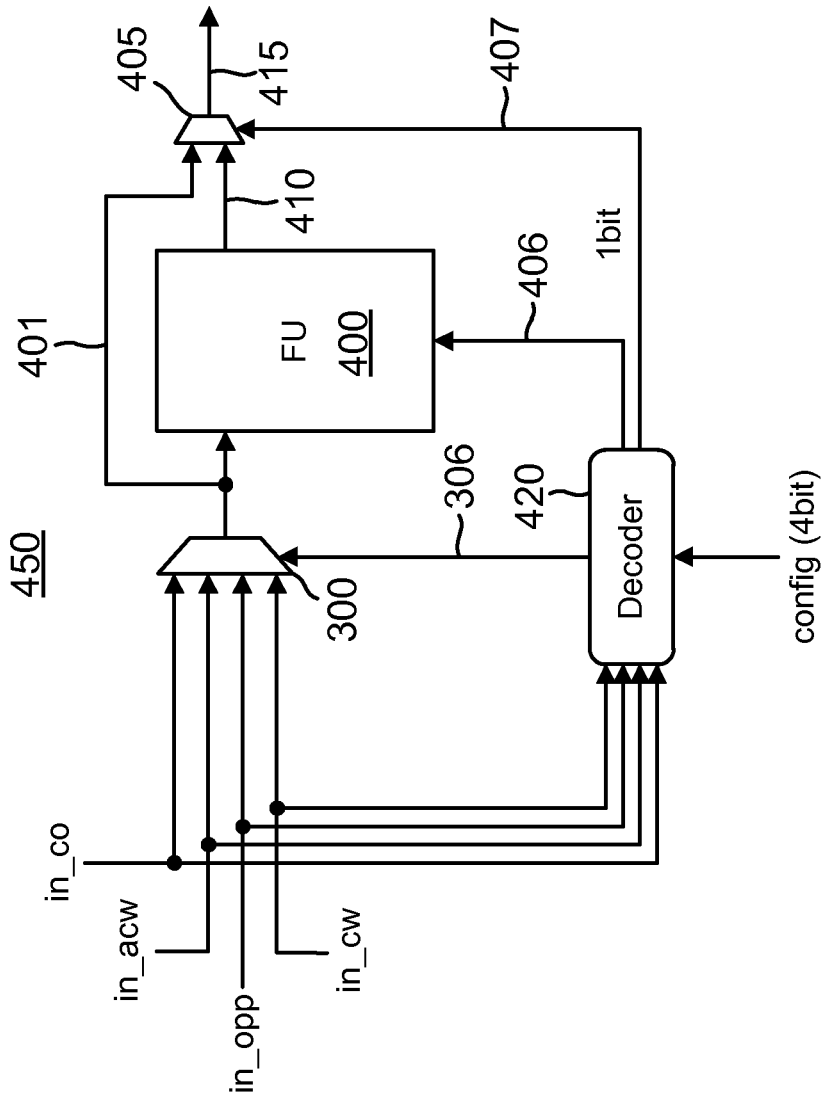
FIG. 4 illustrates a conditional routing circuit that includes in-place functionality for a switch box's I/O port.

To provide additional flexibility, a functional unit may be included within the multiplexer output datapath. An example conditional routing circuit 450 with in-place functionality is shown in FIG. 4. A functional unit 400 receives a multiplexer output 401 from first multiplexer 300 to produce a functional unit output 410. A 2:1 multiplexer 405 (which may also be designated as a second multiplexer within conditional routing circuit 450) selects between multiplexer output 401 and functional unit output 410 to form an output channel 415. A decoder 420 as configured by configuration bits controls whether conditional routing circuit 450 operates in the static routing mode or in the conditional routing mode analogously as discussed with regard to decoder 305 of FIG. 3. For illustration clarity, the 2-bit (or greater) bus width markings for the inputs to decoder 420 and word-width bus markings for the inputs to first multiplexer 300 are not shown in FIG. 4 and are also not shown in the remaining drawings in this disclosure.

Functional unit 400 performs a logical function on the output 401 from first multiplexer 300. To preserve a conventional mode of operation that did not include a functional unit, functional unit 400 may be bypassed such that second multiplexer 405 selects for output 401 from first multiplexer 300. In addition, functional unit 400 may also be enabled or disabled to perform its logical function on first multiplexer output 401. In that regard, the number of configuration bits used to configure decoder 420 determines the total number of states for the modes of operation. For example, if decoder 420 is configured by four configuration bits, then decoder 420 can operate in one of sixteen possible states.

In one embodiment, these sixteen possible states are as follows. Recall that a conventional static routing mode of operation comprises four states corresponding to which one of the four input words is selected by first multiplexer 300. These four states can be replicated by conditional routing circuit 450 if second multiplexer 405 is controlled by a second address signal 407 from decoder 420 to select for the output 401 of first multiplexer 300 and if a first address signal 306 from decoder 420 does not depend on the input words (static routing). Functional unit 400 would also be disabled if possible by a control signal 406 from decoder 420 during these four states. It will be appreciated, however, that in alternative functional unit embodiments control signal 406 would not be included such as if functional unit 400 comprises an inverter.

The static routing mode of operation would also include another four states that are identical to the four states just described except that second multiplexer 405 is controlled by second address signal 407 to select for functional unit output 410. In these four states, functional unit 400 would be enabled to function by control signal 406. There are thus eight states described already. As discussed above, is often useful to have a default state in which first multiplexer 300 is shut down. Thus, decoder 420 may be configured for a disabled state in which first multiplexer 300 disables its output. That leaves seven states left to be described out of the sixteen states as configured by four configuration bits received by decoder 420. Three of these remaining states are also within the static routing mode of operation. In these three remaining states, first address signal 306 does not depend upon the input words to first multiplexer 300. For example, first multiplexer 300 may statically select for the opposite input word in one of the states, the clockwise input word in another state, and the anti-clockwise input word in remaining one of the states. But control signal 406 would depend upon the input words. In other words, analogous to a conditional routing mode of operation, these three remaining static routing mode states would involve decoder 420 selecting for one of the input words and using one of the bits for the decoder-selected input word to determine whether control signal 406 enables or disable operation of functional unit 400.

The four remaining states would all comprise states within the conditional routing mode of operation such that each state corresponds to one of the input words being selected for by decoder 420. Decoder 420 would then decode bits (e.g., two bits) from the decoder-selected input word to form first address signal 306. Since there are four input words that can control the conditional routing by first multiplexer 300, there are four such conditional routing states for decoder 420. During these conditional routing states, the functional unit 400 may be enabled by control signal 406. In addition, second multiplexer 405 may select for functional unit output 410 during these four states.

One can appreciate that additional configuration bits may be used to form additional states for the static and conditional routing modes of operation, Decoder 420 may thus be configured by more than four configuration bits in alternative embodiments. A conditional routing circuit such as circuits 350 and 450 may be considered to comprise a means for conditional selecting from the group of input signals (opposite, clockwise, anti-clockwise, and the instruction cell output word) presented to first multiplexer 300 to form the corresponding output channel of the channel routing circuit. Similarly, a conditional routing circuit such as circuit 450 may also be considered to comprise a means for conditionally processing the selected signal from the group of input signals multiplexed by first multiplexer 300 in a functional operation to form corresponding output channel 415.

Example Embodiments

Some example embodiments will now be discussed to illustrate the wide variety of functions that may be implemented by functional unit 400. In FIG. 5A, a register 500 serves as the functional unit. Decoder 420 controls a write enable (w_en) input 501 to register 500. Thus, decoder 420 may be configured to assert write enable input 501 in both the static and conditional routing modes if the output 401 from first multiplexer 300 is to be registered in register 500. In addition, decoder 420 may be configured to allow a decoder-selected one of the input signals to first multiplexer 300 to control whether the write enable input 501 is asserted or not. Functional unit output 410 in this embodiment is the data output of register 500. Decoder 420 may be configured to drive second address signal 407 so that second multiplexer 405 selects for the registered functional unit output 410 accordingly. But note that functional unit output 410 would represent the previously-stored value in register 500. Register 500 would then register the current output 401 from first multiplexer 300. Alternatively, decoder 420 may be configured such registered functional unit output 410 is bypassed such that second multiplexer 405 selects for first multiplexer output 401. In such a mode, write enable 501 may be de-asserted so that register 500 does not register first multiplexer output 401.

Similarly, functional unit 400 may comprise a shift circuit 505 as shown in FIG. 5B. Functional unit output 410 would then comprise a shifted version of first multiplexer output 401. Depending upon its configuration, decoder 420 drives a left/right shift control signal 515 to control shift circuit 505 accordingly. Depending upon whether the shift function is activated, decoder 420 controls second multiplexer 405 through second address signal 407 accordingly.

In another embodiment, an inverter 510 functions as functional unit 400 as shown in FIG. 5C. Since the output 401 is a multi-bit word, it will be appreciated that inverter 510 comprises a plurality of single-bit inverters. Note that inverter 510 needs no control signal from decoder 420. The resulting conditional routing and/or in-place functionality significantly enhances RICA flexibility and performance. For example, a switch box array in a RICA may be configured to perform a sliding window algorithm on pixel data. At any given calculation cycle, a subset of the switch boxes are configured to form a calculating set. At a subsequent cycle, the subset is shifted in the row direction. Upon shifting the subset to the end of a row, it may then be moved up or down to continue processing the pixel data. Such conditional moving may be readily accomplished using the RICA conditional routing and in-place functionality disclosed herein.

Example Method of Use

Figure 6:
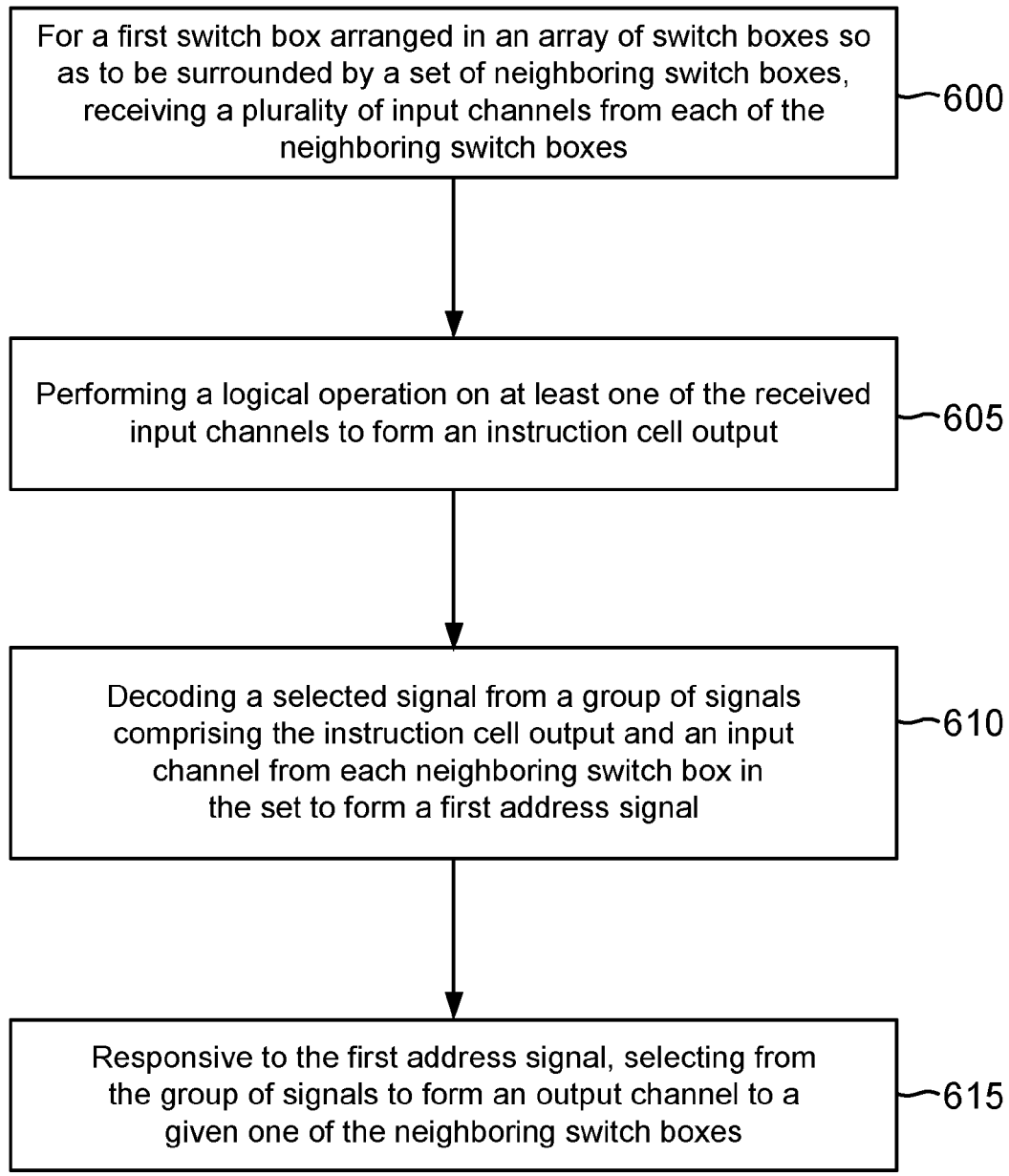
FIG. 6 is a flowchart for an example method of conditional routing by a switch box.

A flowchart for an example method is provided in FIG. 6. The method is defined with regard to a first switch box arranged in an array of switch boxes so as to be surrounded by a set of neighboring switch boxes and begins with a step 600 of receiving a plurality of input channels from each of the neighboring switch boxes. An example of step 600 is shown for switch box 205 in FIG. 2, which receives input channels from the neighboring switch boxes in the north, south, east, and west directions. The method proceeds with a step 605 of performing a logical operation on at least one of the received input channels to form an instruction cell output. An example instruction cell is ALU 110 of FIG. 1B in that ALU 110 forms an instruction cell output from one or more of the received input channels at the ALU's switch box. A step 610 comprises decoding a selected signal from a group of signals comprising the instruction cell output and an input channel from each neighboring switch box in the set to form a first address signal. The method also includes a step 615 of, responsive to the first address signal, selecting a signal from the group of signals to form an output channel to a given one of the neighboring switch boxes. Multiplexer output 401 of FIG. 4 is illustrative of such a selection.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A circuit, comprising:
a plurality of switch boxes, wherein each switch box includes a set of input/output (I/O) ports, each I/O port being configured to receive a plurality of input channels and to output a plurality of output channels;
wherein each I/O port includes a plurality of conditional routing circuits corresponding to the plurality of output channels, each conditional routing circuit for each switch box's I/O port including: a first multiplexer configured to select from a group of signals comprising a single received one of the input channels from each I/O port remaining in the set of I/O ports for the switch box to form a multiplexer output responsive to a first address signal; and a decoder configured to form the first address signal, the decoder being configurable to operate in a static routing mode of operation in which the first address signal does not depend upon the group of signals, the decoder being further configurable to operate in a conditional routing mode of operation in which the first address signal depends upon a one of the received input channels in the group of signals besides the selected received input channel, wherein the conditional routing circuit is configurable to drive the multiplexer output as the conditional routing circuit's output channel.

2. The circuit of claim 1, wherein each switch box includes an instruction cell configured to perform a logical operation on at least one of the input channels received by one of the I/O ports in the set of I/O ports for the switch box to produce an instruction cell output, and wherein the group of signals further includes the instruction cell output.

3. The circuit of claim 2, wherein the plurality of switch boxes are arranged by rows and columns, and wherein the set of I/O ports for each switch box comprise a pair of opposing row I/O ports and a pair of opposing column I/O ports.

4. The circuit of claim 1, wherein each decoder for each switch box's I/O port's conditional routing circuit is configurable responsive to configuration bits from a configuration word for the switch box to be configured to select from its conditional routing circuit's first multiplexer's group of signals to form the decoder-selected signal.

5. The circuit of claim 1, wherein each decoder is configured to decode a subset of bits from the decoder-selected signal to form the first address signal.

6. The circuit of claim 1, wherein each conditional routing circuit further includes a functional unit configured to perform a logical operation on the conditional routing circuit's multiplexer output to form a functional unit output.

7. The circuit of claim 5, wherein each decoder is further configured to form a second address signal, and wherein each conditional routing circuit further includes a second multiplexer configured to select between the conditional routing circuit's multiplexer output and the conditional routing circuit's functional unit output to form the corresponding output channel responsive to the second address signal.

8. The circuit of claim 6, wherein at least one of the functional units comprises a register.

9. The circuit of claim 6, wherein at least one of the functional units comprises a shift circuit.

10. The circuit of claim 1, wherein each decoder is further configurable to operate in the conditional routing mode of operation such that the first multiplexer is configured to select from its group of signals except for the decoder-selected signal responsive to the first address signal to form the multiplexer output.

11. The circuit of claim 2, wherein at least one of the instruction cells comprises an arithmetic logic unit (ALU).

12. The circuit of claim 3, wherein each first multiplexer in each switch box's column I/O port is configured to select from a received input channel from each row I/O port in the switch box and from a received input channel from a remaining column I/O port in the switch box.

13. The circuit of claim 3, wherein each first multiplexer in each row I/O port in each switch box is configured to select from a received input channel from each column I/O port in the switch box and from a received input channel from a remaining row I/O port in the switch box.

14. A method, comprising:
for a first switch box arranged in an array of switch boxes so as to be surrounded by a set of neighboring switch boxes, receiving a plurality of input channels from each of the neighboring switch boxes;
performing a logical operation on at least one of the received input channels to form an instruction cell output;
decoding a decoder-selected signal selected from a group of signals comprising the instruction cell output and a single one of the received input channels from each neighboring switch box in the set to form a first address signal; and
responsive to the first address signal, selecting from the group of signals besides the decoder selected signal to form an output channel to a given one of the neighboring switch boxes.

15. The method of claim 14, further comprising selecting the decoder-selected signal from the group of signals responsive to configuration bits in a configuration word for the first switch box.

16. The method of claim 15, wherein selecting the decoder-selected signal from the group of signals is further responsive to a logical state for each of the signals in the group of signals.

17. The method of claim 14, wherein forming the output channel comprises:
selecting from the group of signals to form a multiplexer output
performing a logical operation on the multiplexer output to form a functional unit output; and
selecting between the multiplexer output and the functional unit output to form the output channel,
selecting between the multiplexer output and the functional unit output to form the output channel.

* * * * *